Feb. 24, 1931.    R. M. PHILLIPS    1,794,092
SANDPAPERING MACHINE
Filed April 19, 1927    2 Sheets-Sheet 1
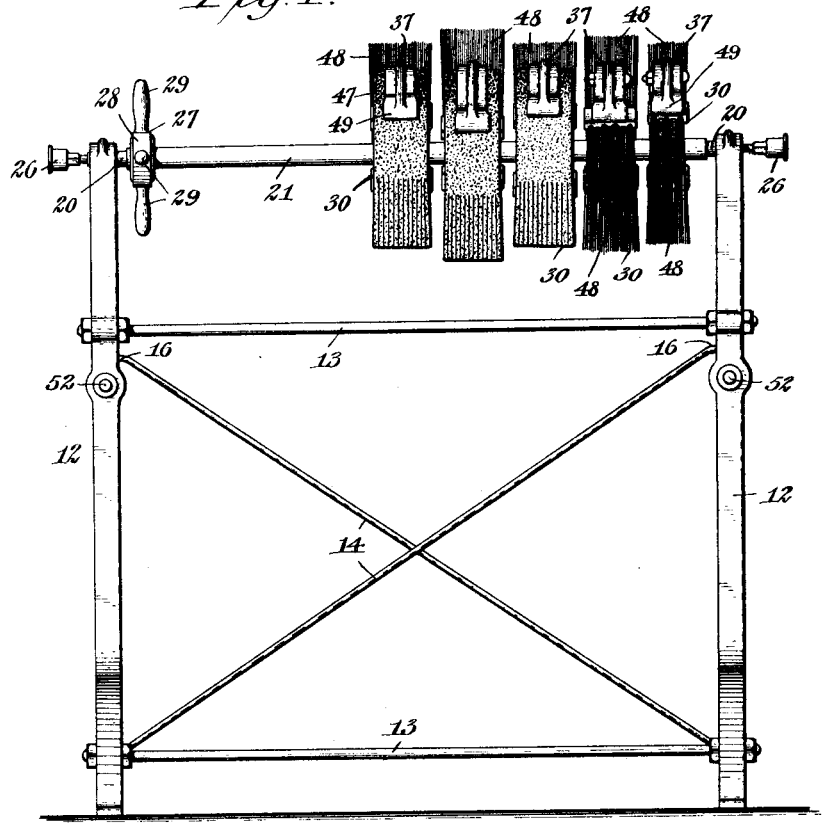
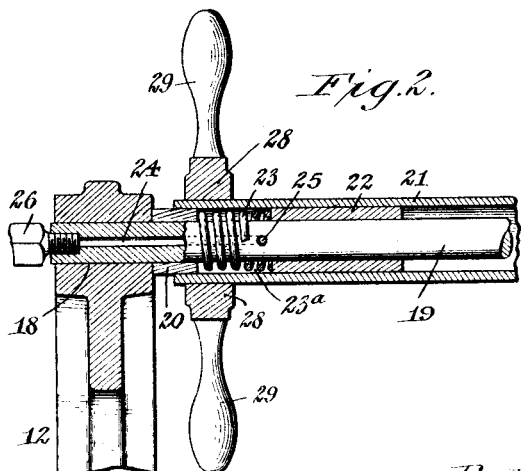
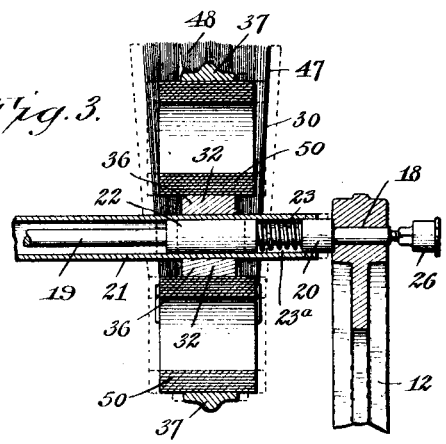
Ralph M. Phillips, Inventor.
By Emil Kenhart
Attorney.
Witness:
J. J. Oberst, Feb. 24, 1931.  R. M. PHILLIPS  1,794,092
SANDPAPERING MACHINE
Filed April 19, 1927  2 Sheets-Sheet 2
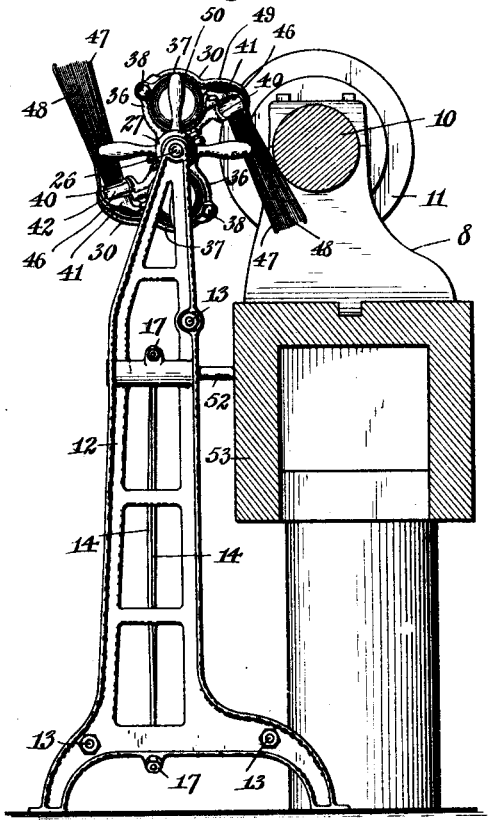
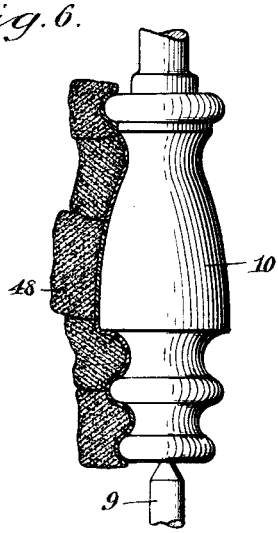
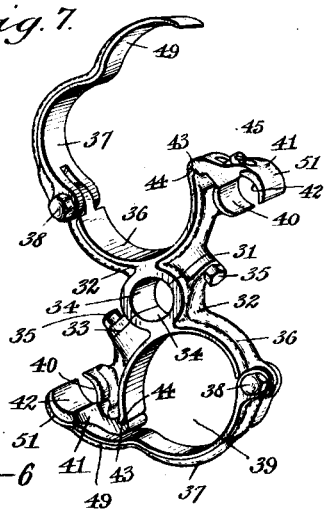
Ralph M. Phillips, Inventor.
By Emil Lenhart
Attorney.
Witness:
J. J. Oberst.

Patented Feb. 24, 1931

1,794,092

UNITED STATES PATENT OFFICE

RALPH M. PHILLIPS, OF JAMESTOWN, NEW YORK

SANDPAPERING MACHINE

Application filed April 19, 1927. Serial No. 185,042.

My invention relates to a sand-papering machine, and it has more particular reference to that type of machine adapted for sand-papering or smoothening columns, balusters, spindles, and other objects of circular formation in cross section, or having at least parts thereof so formed.

My invention has for its object the production of a simple, highly effective and comparatively inexpensive machine for sand-papering or otherwise smoothening objects rotatably mounted.

Another object of my invention is to provide a machine of this kind in which rolls of sand-paper or other abrading material are supported therein and arranged to be advanced as parts thereof become worn.

Another object of my invention is the production of a machine of the type mentioned in which provision is made for supporting and applying different grades of sand-paper or other abrading material to an object to be smoothened so that the object is first papered with a coarse abrasive and then finished with a finer abrasive.

A further object is to provide a series of adjustable smoothening elements and so mounting them that they can be conveniently moved manually in a circular path and vibrated in the direction of their axis.

A further object is to provide a rotatable support for a series of smoothening elements and to arrange said smoothening elements tangentially to said support, with provision embodied therein for individually adjusting said smoothening elements rotatably to diminish the resistance of the smoothening elements against the object being smoothened while moving said smoothening elements in a circular path.

A still further object of my invention is to provide a machine used in connection with a rotating object to be sand-papered or otherwise smoothened which has a rotatable support arranged parallel or substantially parallel with the axis of said object, and having mounted on said support a plurality of smoothening elements disposed tangentially with reference to said support and individually adjustable to cause them to travel in circular paths describing different areas.

A still further object of my invention is to provide a sand-papering machine having a rotatable support arranged for longitudinally-movable vibratory motion and equipped with co-acting means to assist in effecting such motion; also in providing said support with a plurality of sand-papering or smoothening elements rotatable therewith.

With the above and other objects in view to appear hereinafter, my invention consists in the novel features of construction and in the arrangement and combination of parts to be hereinafter described and more particularly set out in the appended claims.

In the drawings:

Fig. 1 is a side elevation of my improved sand-papering machine.

Fig. 2 is an enlarged longitudinal section through one of the end standards and the adjacent portion of the support for the sand-papering or smoothening elements.

Fig. 3 is a similar section, somewhat reduced in size from Fig. 2, showing the opposite end of said support, the opposite end standard, and one of the sand-papering or smoothening elements applied to said support.

Fig. 4 is an end view of the machine, showing the same in conjunction with a lathe having a spindle or other work-piece therein adapted to be smoothened by the sand-papering or smoothening elements of the machine.

Fig. 5 is an enlarged transverse section through one of the sand-papering or smoothening elements and the support to which it is applied and showing in connection therewith a spindle or other work-piece of circular formation in cross section, said work-piece being acted upon by said sand-papering or smoothening element.

Fig. 6 is a cross section taken on line 6—6, Fig. 5.

Fig. 7 is a detached perspective view of a clamping device forming part of each of the sand-papering or smoothening elements.

Sand-papering machines of the kind to which this invention relates are adapted for use in connection with a lathe having centered therein a work-piece turned in whole or part to circular formation in cross section, and oftentimes having parts thereof of different diameters, as best indicated in Fig. 6 of the drawings; a lathe of this kind being illustrated in section in connection with Fig. 4 of the drawings and being designated by the numeral 8.

Clamped between the usual centers or spindles of the lathe, one of which is indicated at 9 in Fig. 6, is the work-piece 10 to be sandpapered or smoothened, and as shown in Fig. 6, the work-piece illustrated is provided with beads, grooves and other parts of different diameters: balusters, spindles, table legs, and columns, being examples of work-pieces so formed.

The live spindle of the lathe has the usual pulley 11 applied thereto, around which a belt (not shown) is passed for rotating the work-piece within the lathe. My improved machine is arranged at the side of the lathe so that the sand-papering or smoothening elements, to be hereinafter described, will come in contact with the work-piece while rotating.

The frame of the machine consists of standards or end members 12 of any suitable formation tied together in spaced relation by means of tie rods 13, or otherwise; and in the preferred construction, in order that the machine can be made comparatively light so that it can conveniently be moved toward and from the lathe, the end members 12 are of open-work construction with one of the tie rods 13 connecting said members near their upper ends and two tie rods connecting their lower ends, said lower ends being laterally extended to provide a secure rest for the machine.

In addition to the tie rods, brace rods 14 are provided which are diagonally disposed and cross each other midway between the end members, these tie rods being bent at an angle at their ends, as at 16, and passed through said end members, the nuts 17 thereof being threaded onto their projecting ends.

At its upper end, each end-member 12 has an opening 18 formed therethrough, and non-rotatably mounted in these openings is a rod 19 which extends from one end member to the other. Non-rotatably arranged on this rod are collars 20 which bear against the inner sides of the end members. The rod 19 may have a driving fit within the end members and the collars 20 may have a driving fit on said rod, but both of these may be held against rotation in any other practicable manner. Surrounding the rod between the standards or end members 12 is a sleeve 21, the ends of which fit loosely over the collars 20 and are spaced from the end members so that the sleeve may move lengthwise between them.

Driven into the sleeve 21 from opposite ends, so as to be non-movable therein, are bronze or other bushings 22 which fit loosely over the rod 19 and are spaced from the collars 20. Arranged in the sleeve 21 between each bushing 22 and the collar 20 adjacent thereto, is a spiral spring 23. The spaces between the bushings 22 and the collars 20 may therefore be termed spring chambers, which I designate by the numeral 23ª. These springs are of equal tension and exert pressure in opposite directions against the bushings 22 within said sleeve so that the sleeve may be referred to as a floating sleeve.

By means of the construction described, the sleeve 21 is provided with bearings at opposite ends and these are lubricated by means of ducts 24 extending from the outer ends of the rod 19 inwardly to points at or near the outer ends of the bushings 22, where said ducts terminate in angular or diametral exits 25. The outer ends of the ducts 24 are enlarged and threaded to receive lubricant cups 26 by means of which the proper lubricant is forced into the duct and from the latter to the spring chambers 23ª and interior of the bushings 22. The collars 20, in addition to serving as abutments for the outer ends of the springs 23, also prevent the escape of the lubricant from the spring chambers.

Mounted at one end of the sleeve 21 is an operating element 27 in the form of a hub 28 having four handles 29 extending therefrom. This operating element may be keyed or otherwise fastened to the sleeve. By means of this or some other suitable operating element, the sleeve 21 is adapted to be rotated slowly and at the same time caused to move back and forth lengthwise or axially on the rod 19. When operating the sleeve, the vibrations caused by the back and forth movement thereof are accelerated by the springs 23, movement of said sleeve in one direction being assisted by one spring while the other is being compressed, and during the reverse movement of the sleeve the compressed spring will aid in such movement, with the result that after the vibration of the sleeve is commenced, the springs materially assist, and only slight manual effort is required to cause continuation of such vibratory movement.

A plurality of sand-papering or smoothening elements 30 are mounted on the sleeve 21, which latter serves as a combined rotatable and vibratory support for said elements. These elements may be slightly spaced apart or be arranged in close relation, as may be desired, and for some kinds of work as, for example, where the object to be sand-papered or smoothened has circular parts separated by non-circular parts, these elements will be arranged to come in contact with the circular parts only, and in such cases certain of the sand-papering or smoothening elements will be separated by comparatively wide spaces.

The sand-papering or smoothening elements may be of the same or different widths, depending on the form of the work-piece to be smoothened, and each comprises a clamping device 31, which in preferred form, consists of two clamping members 32 arranged at opposite sides of the sleeve 21. The clamping members 32 have opposed flat faces 33 provided with opposite semi-circular grooves 34 which form a substantially cylindrical opening through the clamping device to receive the sleeve 21. The two clamping members so arranged are fastened together and onto the sleeve 21 by means of securing bolts 35.

Each clamping member 32 has two substantially semi-circular parts 36, 37 pivotally connected together, as at 38, to form a substantially circular support opening 39 in the clamping member. The parts 36 of the clamping members are connected together and fastened onto the sleeve 21 by means of the bolts 35 and therefore these parts may be termed the inner parts of the clamping members, while the parts 37 may be termed the outer parts thereof. Each of the inner parts 36 has a concaved longitudinal groove 40 formed therein, and fastened to each of these parts is a clamp 41 provided with a concaved longitudinal groove 42 arranged in opposition to the concaved groove 40. Each of these clamps has a comparatively small groove 43 along one edge which receives a bead 44 formed on the inner part of the clamping member to which it is secured. Clamping screws 45 are provided to fasten these clamps to the inner parts of the clamping members, these screws being passed through the clamp and screw-threaded into the inner parts 36 of the clamping members at points between the concaved longitudinal grooves 40 therein and the beads 44 thereon. The beads 44 serve as fulcrums for the clamps, and between the clamp and the inner part of the clamping member to which the clamp is secured, the head 46 of a brush-like member 47 is clamped.

Each of the heads 46 is constructed of wood or other solid material and has opposite sides of convex formation to conform to and fit into the concaved grooves 40 and 42 of the inner part of the clamping member and the clamp, respectively. Each of the brush-like members has an elongated flexible body portion 48 extending outwardly from its head 46 and preferably tangentially to the openings 39 in the clamping member of which it forms part. These brush-like members are therefore adjustably mounted in the clamping members of the clamping device and are oppositely-disposed, the adjustment being made by rotatably moving the heads 46 of the brush-like members. This is accomplished by loosening the clamping screws 45, adjusting the head within its receiving grooves 40 and 42, and then tightening said screws. When tightening said screws, the clamps 41 are caused to swing inwardly on centers provided by the beads 44. The outer part 37 of each clamping member has an overhanging retainer extension 49 formed thereon, which overlies the clamp 41 secured to the co-operating inner part 36. Within each opening 39, a roll of sand-paper 50 or other sheet abrading material is arranged, the sand-paper being of strip-like formation having a width conforming to the width of the sand-papering or smoothening element to which it is applied.

The rolls of sand-paper are partly unrolled so that the outer end portions thereof extend outwardly between the clamp 41 and the overhanging retainer extension 49, the extending portions lying against the bristles of the brush-like member, or against a similar flexible backing or foundation. In order to retain the free outer end of each strip of sand-paper against the flexible backing, the outer surface of the clamp is made convex at 51, and the overhanging retainer extension on the outer part 38 of each clamping member has its inner face correspondingly concaved and in contact with the sand-paper where it overlies the convex portion of the clamp. By reason of this construction, each strip of sand-paper is directed inwardly toward the flexible part or backing of each brush-like member, at which point it leaves the clamping member and the free outer part thereof is therefore held in contact with said flexible part or backing along its entire length and preferably extends a trifle beyond the outer end of the same. Each strip of sand-paper is provided with a number of parallel slits which extend inwardly a distance from the outer edge of the sand-paper.

It is to be noted that the outer end or overhanging retainer extension on the outer part 37 of each clamping member is made comparatively thin and is formed to snap onto the convex surface 51 of the clamp with the abrading element between the two; this being accomplished in any desired manner, such as by having the concaved groove 42 on a radius from the center of the pivot 38 shorter than the radius on which the convex surface 51 is formed, or this effect may be created by having the inner concaved groove 42 curved on the same radius as the outer convex surface 51 of the clamp so that when lying in contact with said convex surface without a strip of abrading material between the two, said surfaces will be in contact at every point. Under the last-mentioned arrangement it will be apparent that when a strip of abrading material is placed between these two surfaces and forced against the outer convex surface of the clamp, the outer surface of the strip of abrading material at this point will be curved to a slightly increased radius. Consequently, by forcing the outer part 37 of each clamping member into position with the overhanging retainer extension against the strip of abrading material the extreme outer end of this overhanging retainer extension will be forced over the outer receding half of the convex surface of the clamp 41 and during this action be slightly sprung so that the retainer strip will be rigidly clamped at this point and the outer part of the clamping member automatically secured against the abrading strip.

The slitted region of the sand-paper is the part that will be brought into contact with the rotatably mounted work-piece to be sand-papered or smoothened, and in the preferred construction, in which two clamping members are provided for each sand-papering or smoothening element, the sand-paper carried by one of said clamping members is of finer grade than that carried by the other.

As many turned work-pieces, or work-pieces having parts thereof turned, are provided with elevated and depressed portions; for example, in the form of circular beads and grooves, the slitted regions of the strips of sand-paper lying against the flexible parts or backing of the brush-like members will, upon rotation of the sand-papering or smoothening elements, come in contact with the depressed portions of the work-piece as well as the elevated portions, and these slitted regions will, of course, conform to the shape of the portion or portions of the work-piece with which they come in contact due to the flexible or yielding backing provided for them. The narrow ribbons of sand-paper between the slits of the slitted outer region enter the depressed portions of the work-piece being sand-papered or smoothened and are crowded together so as to overlie one another, while the portions of the slitted regions in contact with the elevated parts of the work-piece will have their narrow ribbons separated slightly. This would result in the work-piece operated upon being unevenly sand-papered or smoothened and scratch lines and even fine circular elevations and depressions would be formed on the work-piece, unless provision were made for moving the sand-papering or smoothening elements lengthwise along the work-piece while rotating said elements, in the manner described, or otherwise.

In the preferred construction, in which each sand-papering or smoothening element is provided with two brush-like members having their contacting or acting sides covered with sand-paper or some other suitable abrading material, the coarser grade of material carried by one of the clamping members of said sand-papering or smoothening element is first brought into contact with the rotating work-piece to be sand-papered or smoothened, after which the finer grade of material carried by the other clamping member of said sand-papering or smoothening element is brought into contact with said work-piece, thus assuring an absolutely smooth finish for the work-piece. The two grades of material referred to are brought into contact with the work-piece by a slow rotative movement of the support 21 through the medium of the operating element 27. While said sand-papering or smoothening elements are in contact with the work-piece, the sleeve or support 21 is moved back and forth or vibrated manually, aided by the action of the springs 23, so that comparatively little effort is required in operating the machine. It is, of course, understood that for some classes of work a sand-papering or smoothening element having a single brush-like member or backing, may be employed, either individually or in conjunction with other similar elements.

The term "brush-like member" is intended to include any flexible or yielding element capable of assuming the position of the bristles 48 illustrated in the drawings and against which the sheet or strip of abrading material can be held by means of retaining means, such for example, as the retainer extension 49 at the outer end of each of the outer parts 37 of the clamping members.

The operation of the machine is as follows: The machine is placed in close relation to the lathe 8, and for quickly finding the proper relation to the lathe, I have provided positioning pins 52 which extend laterally from the two standards or end members 12 of the frame and bear against the body portion or frame 53 of the lathe, as best shown in Fig. 4. This will so position the sand-papering or smoothening elements in relation to the rotating work-piece to be sand-papered or smoothened that the brush-like members of said elements, covered with abrading material, will come in contact with the object to be sand-papered or smoothened upon moving such elements rotatively.

The work-piece to be sand-papered or smoothened, as viewed in Fig. 4, is preferably rotated counter-clockwise, and the sand-papering or smoothening elements are rotated likewise. To accomplish the latter, the operator grasps the handles 29 of the operating element 27 and brings the brush-like elements with the coarse sand-papering or other abrading material against the rotating work-piece, moving the handles slowly so that the sand-paper moves in contact with the work-piece, and at the same time the operator, while rotating the sand-papering or smoothening element, causes vibratory movement of its support lengthwise or axially so that scratches and fine grooves or depressions cannot be formed on the work-piece during the operation.

When the slitted outer portions of the sand-papering or other material which lies against the flexible or yielding portions of the sand-papering or smoothening elements become worn, such slitted portions may be cut away with a scissors or other suitable tool, after which the outer part 38 of the clamping member is swung outwardly to any desired degree so as to relieve the pressure thereof against the sand-papering material. That portion of the sand-paper directly underneath the extension 49 of the outer member may then be taken hold of to unroll the roll 50 of sand-papering material to a sufficient extent to provide a free portion capable of covering the flexible or yielding part of the sand-papering or smoothening element, after which the extension 49 of the clamping member may be brought into contact with the sand-paper to clamp the same and hold the free end portion against said flexible or yielding part. The new end portion thus provided may then be slitted in the form hereinbefore described, by means of a scissors or other suitable tool.

By arranging the sand-paper in strip form, rolling the same, and confining the rolled portion within the sand-papering or smoothening elements, the worn slitted outer ends of the sand-paper can be easily discarded and new portions provided without waste of material, the strips of sand-paper being utilized from one end thereof to the other.

The combined rotative and axial movement of the support for the sand-papering or smoothening elements is effected by the operator, the rotative movement of said support bringing the sand-papering or smoothening elements in contact with the work-piece, which is preferably rotated at a considerably higher rate of speed than said support; and a machine arranged to provide for such combined movement of the sand-papering or smoothening elements and their support can be constructed to occupy comparatively little space, be inexpensive, and consist of comparatively few parts, yet be fully as effective as more expensive and complicated sand-papering machines.

Having thus described my invention, what I claim is:

1. A sand-papering machine comprising a rotatable support, a sand-papering element secured to said support and comprising two clamping members applied to opposite sides thereof and connected together and to said support, each clamping member comprising two pivotally-connected parts having flexible elements extending in opposite directions therefrom, and abrading material applied to said flexible elements and adapted to come in contact with a rotating work-piece.

2. The combination with a rotating support, of a sand-papering element applied to said support and comprising two hollow parts extending therefrom in opposite directions, two flexible elements carried by said parts and extending therefrom in reverse directions, and a roll of sand-papering material within each of said parts, said rolls having unrolled extending portions covering said flexible elements.

3. The combination with a rotatable support, of means carried by said support including a plurality of units disposed lengthwise along said support, each unit having a flexible element extending therefrom, and abrading material applied to said units receiving support from said flexible elements and being of different degrees of fineness on different units for operation upon a work-piece to be sand-papered, said units being adjustable along said support.

4. The combination with a rotatable support, of an element carried by said support and having an opening therein, abrading material rolled and loosely arranged within said opening and extending outwardly therefrom in unrolled form, and a flexible element applied to said first-mentioned element against which the unrolled portion of said abrading material bears.

5. The combination with a rotatable support, of a clamping member carried by said support and comprising two pivotally-connected parts relatively movable into opened or closed position and when closed forming a roll-receiving opening, sheet abrading material rolled within said roll-receiving opening and having an unrolled portion extending outwardly between said parts, and a brush-like member carried by one of said parts and having the unrolled portion of said sheet abrading material in contact with the flexible portion of said brush-like member.

6. The combination with a rotatable support, of a clamping member fastened to said support and comprising two pivotally-connected parts forming a roll-receiving opening, a clamp carried by one of said parts, a brush-like member having a rigid head adjustably mounted between said last-mentioned part and said clamp and a yielding backing extending outwardly from said head, sheet abrading material arranged in roll form within said roll-receiving opening and having an unrolled portion extending outwardly from said clamp and in contact with the yielding backing of said brush-like member, said abrading material having the region at its outer end slit longitudinally.

7. The combination with a lathe having a work-piece rotatably centered therein and provided with parts of different diameters to be sand-papered or smoothened, of a sand-papering machine having a rotatable support parallel with said work-piece, a plurality of sand-papering elements arranged on said rotatable support in the direction of the length of said work-piece and having flexible elements extending therefrom independently adjustable therein toward and from the axis of said work-piece, and sheet abrading material applied to and carried by each of said sand-papering elements and covering the flexible element thereof, said abrading material being adapted to be brought in contact with the work-piece with said flexible element as a backing therefor and yielding to conform to the outline of said work-piece.

8. A sand-papering device, comprising two hinged parts forming an opening and having, respectively, convex and concave portions in overlying relation, a roll of abrading material within said opening having a portion thereof extending outwardly between said convex and concave portions, and a flexible support against which a portion of said abrading material lies, the hinged part having the concave portion being snapped over the convex portion of the other hinged part to automatically lock said parts together with the strip of abrading material between the two.

9. A sand-papering device, comprising a rotatable support, a sand-papering element having two parts movable toward and from each other and having a roll-retaining opening between the two, one of said parts being secured to said rotatable support, and a roll of abrading material within said opening extending outwardly between said two parts for action against a work-piece.

10. A sand-papering device, comprising two hinged parts forming a roll-receiving opening between the same, a rotatable support to which one of said parts is secured, a roll of abrading material within said roll-receiving opening and having an unrolled portion extending outwardly between said two parts, one of said parts having a free end engaging the outwardly-extending unrolled portion of said abrading material and lockable under pressure to the other of said parts with said abrading material between the two.

In testimony whereof I affix my signature.

RALPH M. PHILLIPS.